(12) United States Patent
Vamaraju et al.

(10) Patent No.: US 10,165,461 B2
(45) Date of Patent: Dec. 25, 2018

(54) METHODS AND SYSTEMS FOR A RANGING PROTOCOL

(71) Applicant: QUALCOMM Incorporated, San Diego, CA (US)

(72) Inventors: Santosh Vamaraju, San Jose, CA (US); Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 15/370,599

(22) Filed: Dec. 6, 2016

(65) Prior Publication Data
US 2017/0230856 A1    Aug. 10, 2017

Related U.S. Application Data

(60) Provisional application No. 62/291,393, filed on Feb. 4, 2016.

(51) Int. Cl.
*H04W 24/10* (2009.01)
*H04W 64/00* (2009.01)
(Continued)

(52) U.S. Cl.
CPC ........... *H04W 24/10* (2013.01); *H04W 64/00* (2013.01); *H04W 76/10* (2018.02); *H04W 84/12* (2013.01); *H04W 88/08* (2013.01)

(58) Field of Classification Search
CPC ..... H04W 24/10; H04W 76/10; H04W 64/00; H04W 84/12; H04W 88/08
See application file for complete search history.

(56) References Cited

U.S. PATENT DOCUMENTS 9,549,386 B2 * 1/2017 Venkatraman ........ H04W 64/00
9,706,359 B2 * 7/2017 Do ........................ H04W 4/023
(Continued)

FOREIGN PATENT DOCUMENTS

WO    WO-2015031031 A1    3/2015

OTHER PUBLICATIONS

Carlos Aldana: "Minor revisions to FTM, 11-15-1404-02-000m-minor-revisions-to-ftm", IEEE Draft, 11-15-1404-02—000m-minor-revisions-to-ftm, IEEE—SA Mentor, Piscataway, NJ USA, vol. 802.11m, No. 2, Nov. 12, 2015 (Nov. 12, 2015), pp. 1-27, XP068099393, [retrieved on Nov. 12, 2015] p. 17, paragraph 8.4.2.36—p. 24, paragraph 8.4.5.12.

(Continued)

*Primary Examiner* — Brian D Nguyen
(74) *Attorney, Agent, or Firm* — Hunter Clark PLLC

(57) ABSTRACT

Disclosed are methods, systems and devices for obtaining a range between devices based, at least in part, on an exchange of wireless messages. For example, wireless devices may obtain measurements of range based, at least in part, on an exchange fine timing measurement (FTM) messages. In one implementation, a message transmitted from a first wireless transceiver device to a second wireless transceiver device may comprise one or more parameters indicative of a range between the first wireless transceiver device and the second wireless transceiver device, or a range between the first wireless transceiver device and a third wireless transceiver device other than the second wireless transceiver device.

21 Claims, 8 Drawing Sheets

(51) Int. Cl.
*H04W 76/10* (2018.01)
*H04W 84/12* (2009.01)
*H04W 88/08* (2009.01)

(56) References Cited

U.S. PATENT DOCUMENTS

| | | | |
|---|---|---|---|
| 2013/0163448 A1* | 6/2013 | Ruuska | G01S 5/0278 370/252 |
| 2016/0088497 A1* | 3/2016 | Segev | H04W 24/02 370/252 |
| 2016/0192138 A1* | 6/2016 | Amizur | H04W 4/023 455/456.1 |
| 2016/0366660 A1* | 12/2016 | Segev | H04W 56/0045 |

OTHER PUBLICATIONS

International Search Report and Written Opinion—PCT/US2016/069007—ISA/EPO—dated Mar. 29, 2017.
Lindskog E (CSR Technology): "Client Positioning using Timing Measurements between Access Points; 11-13-0072-00-000m-client-positioning-using-timing-measurements-between-access-points", IEEE SA Mentor; 11-13-0072-00-000M-Client-Positioning-Using-Timing-Measurements-Between-Access-Points, IEEE-SA Mentor, Piscataway, NJ USA, vol. 802.11m, Jan. 12, 2013 (Jan. 12, 2013), pp. 1-13, XP068040470, [retrieved on Jan. 12, 2013] p. 4-p. 6 p. 11.

* cited by examiner

| Element ID | Length | Element ID Extension | Information |
|---|---|---|---|
| 1 | 1 | 0 or 1(M82) | variable |

Octets:

FIG. 6

| Measurement Start Time | Range | Max Range Error Exponent | Reserved | Optional Subelements |
|---|---|---|---|---|
| 4 | 3 | 1 | 1 | variable |

Octets:

FIG. 7

METHODS AND SYSTEMS FOR A RANGING PROTOCOL

CROSS-REFERENCE TO RELATED APPLICATIONS

This application claims the benefit of U.S. Provisional Application No. 62/291,393, entitled "Methods and Systems for a Ranging Protocol," filed Feb. 4, 2016, which is assigned to the assignee hereof and which is expressly incorporated herein by reference.

BACKGROUND

Field

Embodiments described herein are directed to obtaining measurements of signals acquired from a mobile transmitter.

Information

Satellite positioning systems (SPSs), such as the global positioning system (GPS), have enabled navigation services for mobile handsets in outdoor environments. Likewise, particular techniques for obtaining estimates of positions of mobile device in indoor environments may enable enhanced location based services in particular indoor venues such as residential, governmental or commercial venues. For example, a range between a mobile device and a transceiver positioned at fixed location may be measured based, at least in part, on a measurement of a round trip time (RTT) measured between transmission of a first message from a first device to a second device and receipt of a second message at the first device transmitted in response to the first message.

SUMMARY

Briefly, one particular implementation is directed to a method, at a first wireless transceiver device, comprising: determining one or more parameters indicative of a range between the first wireless transceiver device and the second wireless transceiver device based, at least in part, on receipt of one or more fine timing measurement (FTM) messages received at the first wireless transceiver device; and transmitting one or more messages from the first wireless transceiver device to the second wireless transceiver device comprising the one or more parameters, wherein the first and second wireless transceiver devices are not associated.

Another particular implementation is directed to a first wireless station (STA), comprising: a wireless transceiver; and a processor coupled to the wireless transceiver to: determine one or more parameters indicative of a range between the first STA and a second STA based, at least in part, on receipt of one or more fine timing measurement (FTM) messages received at the first wireless transceiver device; and initiate transmission of one or more messages through the wireless transceiver to the second STA comprising the one or more parameters, and wherein the first and second STAs are not associated.

Another particular implementation is directed to a first wireless transceiver device, comprising: means for determining one or more parameters indicative of a range between the first wireless transceiver device and a second wireless transceiver device based, at least in part, on receipt of one or more fine timing measurement (FTM) messages received at the first wireless transceiver device; and means for transmitting one or more messages from the first wireless transceiver device to the second wireless transceiver device comprising the one or more parameters, wherein the first and second wireless transceiver devices are not associated.

Another particular implementation is directed to a non-transitory storage medium comprising computer readable instructions stored thereon which are executable by a processor of a first wireless transceiver device to: determine one or more parameters indicative of a range between the first wireless transceiver device and a second wireless transceiver device based, at least in part, on receipt of one or more fine timing measurement (FTM) messages received at the first wireless transceiver device; and initiate transmission of one or more messages through the first wireless transceiver device comprising the one or more parameters, and wherein the first and second wireless transceiver devices are not associated.

Another particular implementation is directed to a method at a first wireless transceiver device comprising: transmitting one or more messages from the first wireless transceiver device to a second wireless transceiver device comprising one or more parameters indicative of a range between the first wireless transceiver device and a third wireless transceiver device other than the second wireless transceiver device, wherein the one or more parameters are determined based, at least in part, on receipt of one or more fine timing measurement (FTM) messages received at the first wireless transceiver device, and wherein the first and second wireless transceiver devices are not associated.

Another particular implementation is directed to a first wireless station (STA), comprising: a wireless transceiver; and a processor coupled to the wireless transceiver to: initiate transmission of a message from the first STA to a second STA comprising one or more parameters indicative of a range between the first STA and a third STA other than the second STA, wherein the one or more parameters are determined based, at least in part, on receipt of one or more fine timing measurement (FTM) messages received at the first wireless transceiver device, and wherein the first and second wireless transceiver devices are not associated.

Another particular implementation is directed to a first wireless transceiver device, comprising: means for determining one or more parameters indicative of a range between the first wireless transceiver device and a second wireless transceiver device based, at least in part, on receipt of one or more fine timing measurement (FTM) messages received at the first wireless transceiver device; and means for transmitting one or more messages from the first wireless transceiver device to a third wireless transceiver device other than the second wireless transceiver device comprising the one or more parameters, wherein the first and third wireless transceiver devices are not associated.

Another particular implementation is directed to a non-transitory storage medium comprising computer readable instructions stored thereon which are executable by a processor of a first wireless transceiver device to: initiate transmission of one or more messages from the first wireless transceiver device comprising one or more parameters indicative of a range between the first wireless transceiver device and a third wireless transceiver device other than the second wireless transceiver device, wherein the one or more parameters are determined based, at least in part, on receipt of one or more fine timing measurement (FTM) messages received at the first wireless transceiver device, and wherein the first and second wireless transceiver devices are not associated.

Another particular implementation is directed to a method at first wireless transceiver device, comprising: receiving one or more messages from a second wireless transceiver device comprising one or more parameters indicative of a range between the second wireless transceiver device and a third wireless transceiver device other than the first wireless transceiver device, wherein the one or more parameters are determined based, at least in part, on receipt of one or more fine timing measurement (FTM) messages at the second wireless transceiver device, and wherein the first and second wireless transceiver devices are not associated.

Another particular implementation is directed to a first wireless station (STA), comprising: a wireless transceiver; and a processor coupled to the wireless transceiver to: obtain one or more messages received at the wireless transceiver from a second STA comprising one or more parameters indicative of a range between the second STA and a third STA other than the first STA, wherein the one or more parameters are determined based, at least in part, on receipt of one or more fine timing measurement (FTM) messages at the second wireless transceiver device, and wherein the first and second wireless transceiver devices are not associated.

Another particular implementation is directed to a non-transitory storage medium comprising computer readable instructions stored thereon which are executable by a processor of a first wireless transceiver device to: obtain one or more messages received at the first wireless transceiver device from a second wireless transceiver device comprising one or more parameters indicative of a range between the second wireless transceiver device and a third wireless transceiver device other than the first wireless transceiver device, wherein the one or more parameters are determined based, at least in part, on receipt of one or more fine timing measurement (FTM) messages at the second wireless transceiver device, and wherein the first and second wireless transceiver devices are not associated.

Another particular implementation is directed to a method at a first wireless transceiver device comprising: receiving one or more messages from a second wireless transceiver device comprising one or more parameters indicative of a range between the first wireless transceiver device and a the second wireless transceiver device, wherein the one or more parameters are determined based, at least in part, on receipt of one or more fine timing measurement (FTM) messages at the second wireless transceiver device, and wherein the first and second wireless transceiver devices are not associated.

Another particular implementation is directed to a first wireless station (STA), comprising: a wireless transceiver; and a processor coupled to the wireless transceiver to: obtain one or more messages received at the wireless transceiver from a second STA comprising one or more parameters indicative of a range between the first STA and the second STA, wherein the one or more parameters are determined based, at least in part, on receipt of one or more fine timing measurement (FTM) messages at the second wireless transceiver device, and wherein the first and second wireless transceiver devices are not associated.

Another particular implementation is directed to non-transitory storage medium comprising computer readable instructions stored thereon which are executable by a processor of a first wireless transceiver device to: obtain one or more messages received at the first wireless transceiver device from a second wireless transceiver device comprising one or more parameters indicative of a range between the first wireless transceiver device and the second wireless transceiver device, wherein the one or more parameters are determined based, at least in part, on receipt of one or more fine timing measurement (FTM) messages at the second wireless transceiver device, and wherein the first and second wireless transceiver devices are not associated.

It should be understood that the aforementioned implementations are merely example implementations, and that claimed subject matter is not necessarily limited to any particular aspect of these example implementations.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIGS. 6 and 7 are diagrams illustrating fields of a message transmitted between wireless stations according to particular embodiments;

Figure 1:
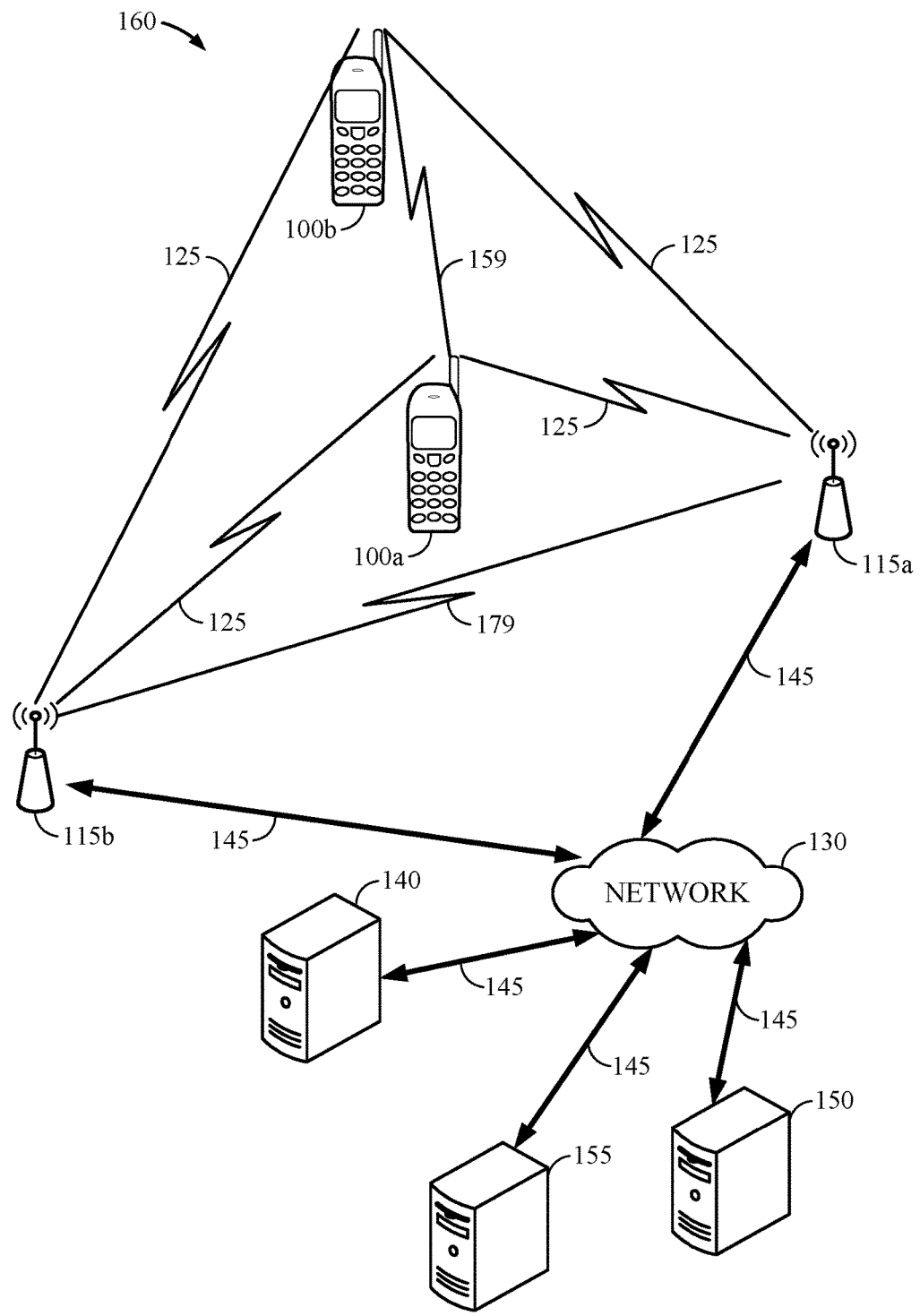
FIG. 1 is a system diagram illustrating certain features of a system containing a mobile device, in accordance with an implementation.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As discussed below, particular message flows may enable effective and efficient measurements of a range in connection with a transmission of messages between wireless stations (STAs). In a particular example, a STA may comprise any one of several types of transceiver devices such as, for example, a mobile user station (e.g., smartphone, notebook computer, tablet computer, etc.) or wireless service access device (e.g., wireless local area network (WLAN) access point, personal area network (PAN) or femto cell). Particular message flows and fields in message frames may enable obtaining round-trip time (RTT) or time of flight (TOF) measurements with sufficient accuracy for measuring a range between the wireless STAs using fewer messages, for example. Such a measured range may be used in any one of several applications including positioning operations, for example.

As discussed below, a first STA may transmit a fine timing measurement request message to a second STA to initiate a process for an exchange of messages or frames enabling the first STA to obtain an RTT or TOF measurement. In a particular implementation, the fine timing measurement request message may include an indication as to whether the first STA is capable of sharing ranging measurements or other parameters indicative of range. In a particular implementation, subsequent to computation of an RTT or TOF measurement, the first STA may transmit one or more messages to the second STA comprising a computed range, TOF or RTT measurement or other parameter indicative of range. It should be understood that this is merely an example implementation and that claimed subject matter is not limited in this respect.

Transmissions of messages between STAs for the measurement of RTT typically occurs in addition to other message traffic supporting other applications such as voice, video, HTTP, data, just to provide a few examples. Accordingly, in dense operating environments, messaging between STAs for the measurement of RTT may increase congestion and contention for wireless link resources. In particular implementations discussed below, particular positioning techniques may be supported by measuring a TOF for the transmission of a message between STAs using fewer messages than typical techniques used for measuring RTT. According to an embodiment, TOF may be measured for individual messages in a "burst" of messages transmitted close in a sequence. Combining multiple TOF measurements from a burst of received messages may enable reduction in measurement errors, for example.

According to an embodiment, a first STA may transmit a message to a second STA requesting that the second STA provide or share parameters indicative of a range between the first and second STAs. Here, the second STA may respond to such a request by transmitting an FTM Range Report message. In this scenario, the first and second STAs may be in an "associated" state in that there has been established a particular communication channel enabling an exchange of particular data, information or messaging. First and second STAs may be in an associated state if at least one of the first and second STAs comprise an access point (AP), and the first and second STAs had engaged in an exchange of messages beforehand. In the absence of the first and second devices being in an associated state, there is no convenient procedure allowing the first and second devices to exchange parameters indicative of range. This significantly limits the ability of devices to share parameters indicative of range based on exchanges of FTM messages.

According to an embodiment, as shown in FIG. 1, mobiles device 100a or 100b may transmit radio signals to, and receive radio signals from, a wireless communication network. In one example, a mobile device 100 may communicate with a communication network by transmitting wireless signals to, or receiving wireless signals from, a local transceiver 115 over a wireless communication link 125.

In a particular implementation, a local transceiver 115 may be positioned in an indoor environment. A local transceiver 115 may provide access to a wireless local area network (WLAN, e.g., IEEE Std. 802.11 network) or wireless personal area network (WPAN, e.g., Bluetooth network). In another example implementation, a local transceiver 115 may comprise a femto cell transceiver capable of facilitating communication on wireless communication link 125 according to a cellular communication protocol. Of course it should be understood that these are merely examples of networks that may communicate with a mobile device over a wireless link, and claimed subject matter is not limited in this respect.

In a particular implementation, local transceiver 115a or 115b may communicate with servers 140, 150 and/or 155 over a network 130 through links 145. Here, network 130 may comprise any combination of wired or wireless links. In a particular implementation, network 130 may comprise Internet Protocol (IP) infrastructure capable of facilitating communication between a mobile device 100 and servers 140, 150 or 155 through a local transceiver 115. In another implementation, network 130 may comprise wired or wireless communication network infrastructure to facilitate mobile cellular communication with mobile device 100.

In a particular implementation, mobile device 100 may be capable of computing a position fix based, at least in part, on signals acquired from local transmitters (e.g., WLAN access points positioned at known locations). For example, mobile devices may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or RTT. In alternative implementations, mobile device 100 may obtain an indoor position fix by applying characteristics of acquired signals to a radio heatmap indicating expected angle of arrival (AoA). In other alternative implementations, as pointed out above, mobile device 100 may obtain an indoor position fix by applying characteristics of acquired signals to a radio heatmap indicating expected TOF. Accordingly, a radio heatmap may comprise TOF, AoA, SI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected AoA, TOF, RSSI or RTT. It should be understood, however, that these are merely examples of values that may be stored in a radio heatmap, and that claimed subject matter is not limited in this respect.

In particular implementations, a mobile device 100 or a local transceiver 115 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, magnetic heatmaps, locations and identities of transmitters, routeability graphs, just to name a few examples.

In a particular implementation, particular messages flows between wireless STAs may be implemented for obtaining a measurement of RTT from an exchange of messages between the STAs for use in positioning operations as discussed above. In particular implementations, as described below, any STA may comprise a mobile device (e.g., mobile device 100) or a stationary transceiver (e.g., IEEE std. 802.11 access point, stationary Bluetooth device, local transceiver 115, etc.). As such, an exchange of messages between wireless STAs may comprise an exchange of messages between a mobile device and a stationary transceiver (e.g., between a mobile device 100 and local transceiver 115 over a wireless link 125), between two peer mobile devices (e.g., between mobile devices 100a and 100b over wireless link 159), or between two stationary transceivers (e.g., between local transceiver 115a and local transceiver 115b over wireless link 179), just to provide a few examples. In particular implementations, various techniques described herein may incorporate some, but not necessarily all, aspects or features of IEEE P802.11-REVmc™/D6.0 Draft Standard 802.11 for Information technology—Telecommunications and information exchange between systems, Local and metropolitan area networks—Specific requirements Part 11: Wireless LAN Medium Access Control (MAC) and Physical Layer (PHY), January 2016 (hereinafter "IEEE std. 802.11"), June 2016. Indeed, it should be understood that some features described herein are not shown, described or taught in the IEEE std. 802.11.

Figure 2:
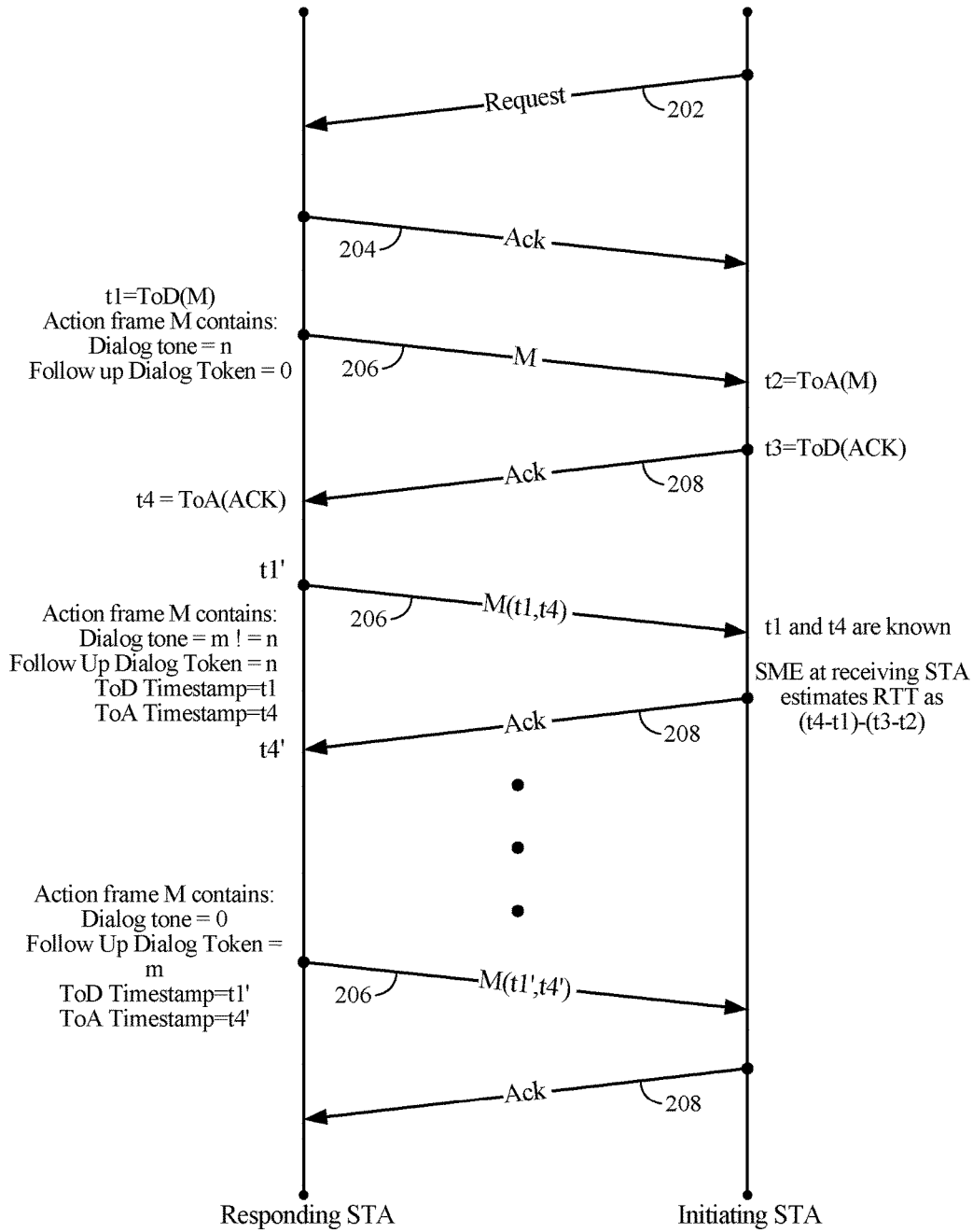
FIGS. 2 and 3 are message flow diagrams according to particular embodiments.

FIG. 2 is a diagram illustrating a message flow between wireless stations STAs including a "responding" STA and an "initiating" STA according to an embodiment. In this context, a responding STA or initiating STA may comprise any one of several transceiver devices including a mobile device (e.g., mobile device 100) or stationary access transceiver device (e.g., local transceiver 115). It should be understood, however, that these are merely examples of an initiating STA or a responding STA, and claimed subject matter is not limited in this respect. An initiating STA may obtain or compute one or more measurements of RTT based, at least in part, on timing of messages or frames transmitted between the initiating STA and a responding STA. As used herein, the terms "message" and "frame" are used interchangeably. The initiating STA may transmit a fine timing measurement request message or frame ("Request") 202 to the responding STA and receive a fine timing request message acknowledgement message or frame ("Ack") 204 transmitted in response. In a particular implementation, while not limiting claimed subject matter in this respect, contents of such a fine timing measurement request message 202 may be as shown in the IEEE std. 802.11. In particular implementations, such an Ack frame 204 may merely provide an indication of receipt of a previously transmitted message. The initiating STA may then obtain or compute an RTT measurement based, at least in part, on time stamp values (t1, t4) provided in fine timing measurement messages or frames ("M") 206 received from the responding STA (and transmitted in response to receipt of a fine timing measurement request message). In a particular implementation, as shown in the message flow diagram, a sequence of multiple exchanges of alternating fine timing measurement messages 206 followed by fine timing measurement acknowledgement messages 208 may create additional time stamp values (t1, t2, t3 and t4).

According to an embodiment, a fine timing measurement (FTM) request message transmitted by an initiating STA may include fields, parameters, etc. characterizing a desired exchange of messages with a responding STA to provide fine timing measurements to the initiating STA enabling the initiating STA to compute an RTT measurement. In response to receipt of a FTM request message, a responding STA may transmit to the initiating STA one or more FTM messages including measurements or parameters enabling the initiating STA to compute RTT or other parameters indicative of range.

In a particular implementation, while not limiting claimed subject matter in this respect, contents of such a fine timing measurement message or frame may be as shown in the IEEE std. 802.11. In one example implementation, an initiating STA may compute an RTT measurement as (t4−t1)−(t3−t2), where t2 and t3 are the time of receipt of a previous fine timing measurement message or frame and transmission of a preceding acknowledgement message or frame, respectively. The initiating STA may transmit a series of fine timing measurement request messages in a burst to obtain a corresponding number of RTT measurements which may be combined for cancellation of unbiased measurement noise in computing a range between the receiving and responding STAs.

FTM request messages and FTM messages may be transmitted by STAs in addition to frames or messages for other services (e.g., for Internet Protocol messaging). In dense wireless traffic scenarios such as airport terminals or stadium events, transmission of FTM request messages and FTM messages for the computation of RTT may stress available messaging capacity at a STA. Particular implementations discussed herein may be directed to an exchange of messages for obtaining measurements for computation of range between STAs using the transmission of fewer messages by a STA.

According to an embodiment, a TOF of a message wirelessly transmitted from a transmitting device and acquired at a receiving device may be measured if the transmitted message includes a time stamp value indicating a transmission time. In a particular implementation, the transmitted message may comprise fields (e.g., preamble, header and payload) containing encoded symbols that are detectable at the receiving device. To acquire the transmitted message and determine a time of arrival, the receiving device may detect or decode a particular symbol or symbols in a sequence of symbols being transmitted by the message. If the particular symbol is referenced to the time stamp value also included in the transmitted message, the receiving device may measure TOF=RTT/2 based on a different between the time stamp value and an instance that the particular symbol is decoded or detected.

Figure 3:
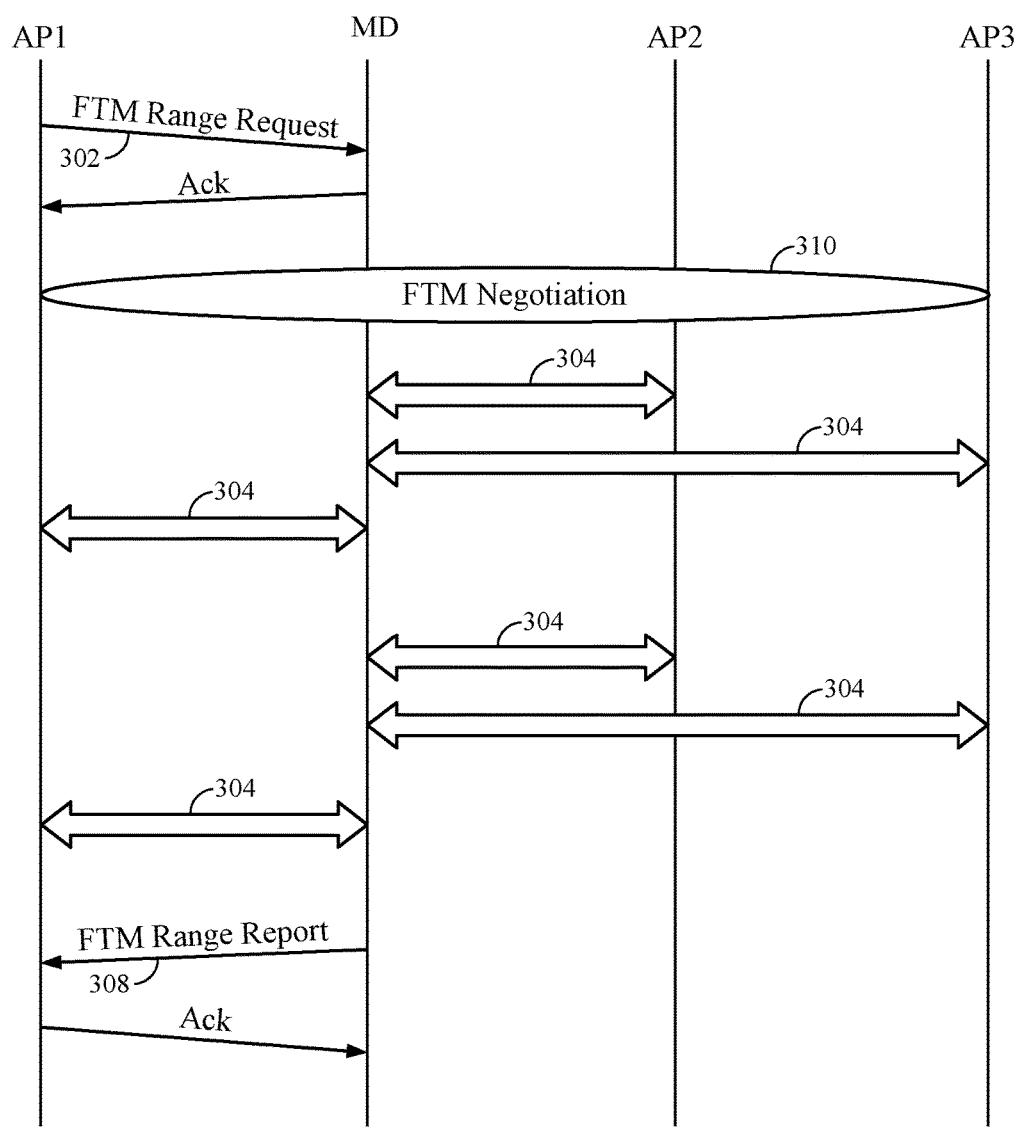

In particular network-centric positioning (NCP) techniques, an access point (AP) may request that a mobile device obtain measurements that may be used to compute a location of the mobile device. For example, an AP may transmit an FTM range request message to a mobile device to request that the mobile device obtain measurements based on messages exchanged with multiple devices (e.g., messages exchanged with the AP and other APs in operating in an area) as set forth in IEEE std. 802.11. As illustrated in FIG. 3, an access point AP1 transmits an FTM range request message 302 to a mobile device MD. In a particular implementation, FTM range report message 302 may be transmitted according to IEEE std. 802.11. Mobile device MD may then have one or more message exchanges 304 (e.g., FTM request messages and FTM messages) with access point AP1, access point AP2 and access point AP3 to obtain measurements such as, for example RTT or TOA, just to provide a couple of examples. Mobile device MD may then transmit an FTM range report message 308 including, for example, parameters indicative of ranges to access points AP1, AP2 or AP3, or any combination thereof (e.g., measured ranges, RTT measurements, TOA measurements or other measurements indicative of range) as set forth in IEEE std. 802.11.

In this context, mobile device MD provides a specific example of an "observing wireless transceiver device" in that mobile device MD comprises a wireless transceiver device that is capable of obtaining observations (e.g., messages, signals, etc.) that are indicative of a range to at least one other neighboring wireless transceiver device. It should be understood, however, that mobile device MD is merely an example of an observing wireless transceiver device, and that other types of wireless transceiver devices (e.g., stationary access points) may be used without deviating from claimed subject matter. Also, access point AP1 may provide a specific example of an "assisting wireless transceiver device" in that access point AP1 comprises a wireless transceiver device that is capable of transmitting messages to an observing wireless transceiver device comprising providing parameters, values, etc. that may be used by the observing wireless transceiver device in obtaining observations of neighboring wireless transceiver devices. It should be understood, however, that access point AP1 is merely an example of an assisting wireless transceiver device, and that other types of wireless transceiver devices (e.g., mobile devices) may be used without deviating from claimed subject matter.

According to an embodiment, FTM Range Request message 302 may provide parameters that may be used by mobile device MD in initiating or participating in one or more exchanges of messages 304 with neighboring wireless transceiver devices such as access points AP1, AP2 and AP3. Such an exchange of messages 304 may enable mobile device MD to obtain on or more measurements or observations indicative of ranges between mobile device MD and neighboring wireless transceiver devices such as, for example, measurements of RTT, TOF or range. In one example implementation, an exchange of messages 304 between mobile device MD and a neighboring wireless transceiver device may be executed as mobile device MD acting as an initiating STA and the neighboring wireless transceiver device acting as a responding STA as discussed above. In an alternative implementation, an exchange of messages 304 between mobile device MD and a neighboring wireless transceiver device may be executed as mobile device MD acting as a responding STA and the neighboring wireless transceiver device acting as an initiating STA as discussed above. In an example embodiment, a negotiation 310 between mobile device MD and neighboring wireless transceiver device may enable determination of roles as initiating STA and responding STA for subsequent exchanges of messages 304. Here, in this particular example implementation, mobile device MD may act as an initiating while access points AP1, AP2 and AP3 may perform as responding STAs with respect to mobile device MD.

In the particular implementation of FIG. 3, an FTM range request message from access point AP1 acting as an assisting wireless transceiver device may indicate particular neighboring wireless transceiver devices (e.g., AP2 and AP3) with which mobile device MD may exchange messages for obtaining observations or measurements. For example, AP1 may transmit one or more Neighbor Report messages to an observing wireless transceiver device comprising parameters characterizing one or more neighboring wireless transceiver devices.

FIG. 3 is directed to a particular embodiment in which an FTM Range Report message 308 is provided to an AP1 in response to an FTM Range Request message 302. In some implementations, AP1 may determine that mobile device MD is capable of providing an FTM Range Report in the course of a process to "associate" mobile device MD with a network (e.g., authentication procedure performed as STA enters a venue) to place AP1 and STA in a particular connection state following an exchange of messages. An FTM range report may provide a means for a requesting STA to request a responding STA that advertises FTM Range Report capability to measure and report the ranges between the responding STA and other nearby devices where the ranges are determined using the FTM procedures discussed above.

In an embodiment, a requesting STA may obtain an ability to request an FTM Range Report capability when it receives a message from the responding STA indicating its ability to provide the FTM Range Report in a Radio Measurement (RM) Enabled Capabilities element of a message. Such an RM Enabled Capabilities element may be present in beacons, probe responses, association request, association response, reassociation request and reassociation response, just to name a few examples. As such, a requesting first STA may request a second STA for the FTM Range report if the second STA had advertised its support by means of an association process. Here, the ability for a particular first STA to request an FTM Range Report is typically limited to other STAs to which the first STA has been associated beforehand.

As pointed out above, an association process may comprise a process to authenticate and establish a level of communication between STAs. In an example implementation, as illustrated in the message flow diagram of FIG. 4, a mobile station and AP may exchange a series of IEEE std. 802.11 management frames to place the mobile station and AP in an authenticated and associated state. Prior to a probe request message, the mobile station may start out as not authenticated and associated. The mobile station may transmit probe requests to discover IEEE std. 802.11 networks within its proximity. The probe request may advertise the mobile station's supported data rates and IEEE std. 802.11 capabilities such as capabilities set forth in IEEE std. 802.11n for exchange of FTM messages or FTM request messages, for example. Because a probe request is transmitted from the mobile station to the destination layer-2 address and BSSID of ff:ff:ff:ff:ff:ff, APs that receive the probe request may respond. An AP receiving the probe request may check to see if the mobile station has at least one common supported data rate. If they have compatible data rates, a probe response message may be transmitted to advertise parameters such as the SSID (wireless network name), supported data rates, encryption types or other IEEE std. 802.11 capabilities of the AP, or any combination thereof.

According to an embodiment, the mobile station may choose compatible networks from among probe responses it receives. Compatibility may be based on encryption type, for example. Once compatible networks are discovered the mobile station may attempt low-level IEEE std. 802.11 authentication with compatible APs. Here, it is pointed out that IEEE std. 802.11 authentication may not be the same as WPA2 or 802.1X authentication mechanisms which occur after a mobile station is authenticated and associated.

The mobile station may transmit a low-level IEEE std. 802.11 authentication frame to an AP setting the authentication to an open state and the sequence to 0x0001. The AP may receive the authentication frame and respond to the mobile station with an authentication frame set to open indicating a sequence of 0x0002. If the AP receives any frame other than an authentication or probe request from a mobile station that is not authenticated, it may respond with a deauthentication frame placing the mobile into an unauthenticated an unassociated state. The station may then have to begin the association process from the low level authentication step. At this point the mobile station may be authenticated but not yet associated with the AP. In some particular implementations, IEEE std. 802.11 capabilities may allow a mobile station to low-level authenticate to multiple APs. This may speed up an association process the mobile station if moving between APs. In a particular implementation, a mobile station may be IEEE std. 802.11 authenticated to multiple APs.

Once a mobile station selects an AP (from among responding APs) to associate to, the mobile station may transmit an association request to the selected AP. The association request may contain chosen encryption types and other compatible IEEE std. 802.11 capabilities.

If the AP receives a frame from the mobile station that is authenticated but not yet associated, it may respond with a disassociation frame placing the mobile station into an authenticated but unassociated state. If the elements in the association request match the capabilities of the AP, the AP may create an Association ID for the mobile station and respond with an association response with a success message granting network access to the mobile station. Following the association response message, the mobile station may be successfully associated to the AP, and may commence data transfer such as, for example, exchange of FTM messages and FTM request messages.

It is often desired by a responding STA participating in an FTM procedure to obtain the ranges of an initiating STA with the latter's nearby APs and with itself. However, if the initiating STA is not associated beforehand with the AP (FTM responder) (e.g., according to a process shown in FIG. 4) that AP may not be able to request and obtain the FTM Range report. Particular implementations described below are directed to techniques for enabling a responding STA to obtain an FTM Range Report from the initiating STA that does not require association of the initiating STA with the responding STA as a precondition.

Figure 5:
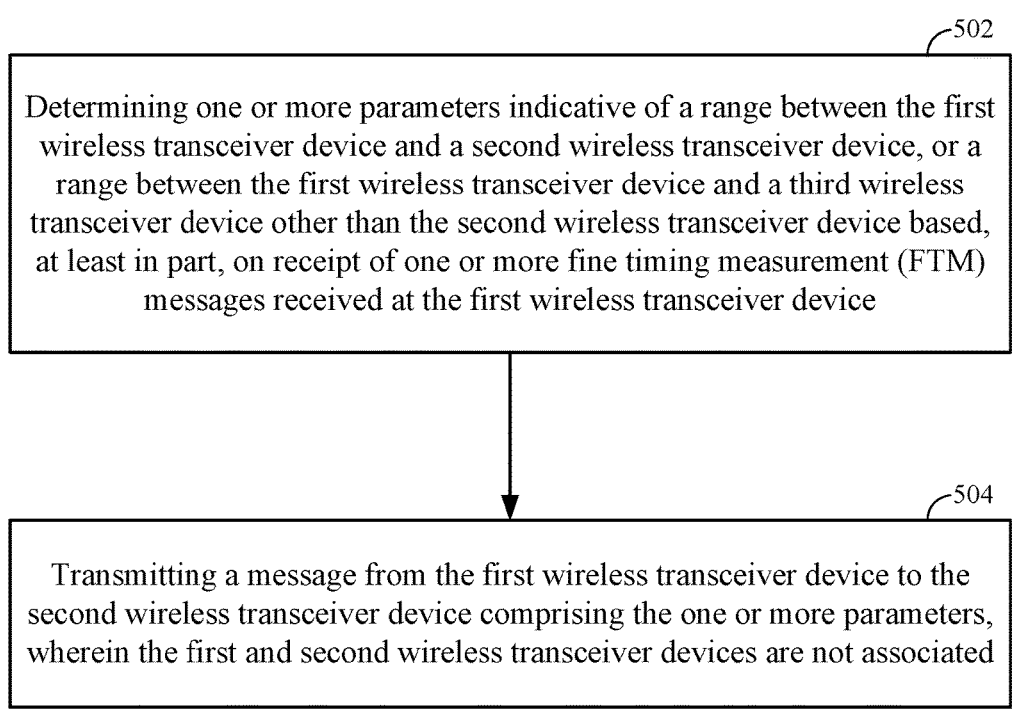
FIG. 5 is a flow diagram of a process to provide parameters indicative of range between devices according to particular embodiments.

FIG. 5 is a flow diagram of a process which may be used to convey parameters indicative of ranges between devices determined based, at least in part, on an exchange of FTM messages according to an embodiment. In the presently illustrated embodiment, parameters indicative of range are transmitted from a first wireless transceiver device to a second wireless transceiver device that not in an "associated" state. In an implementation, at block 502 the first wireless transceiver device may determine parameters indicative of a range between the first wireless transceiver device and the second wireless transceiver, or indicative of a range between the first wireless transceiver device and a third wireless transceiver device other than the second wireless transceiver device. This may be accomplished based, at least in part, on an exchange of FTM messages using one or more techniques discussed above, for example. Example parameters indicative of range may include, for example, distance, RTT measurements, TOF measurements, measurements that may be used to compute RTT or TOF measurements, just to provide a few non-limiting examples of parameters indicative of range.

Figure 4:
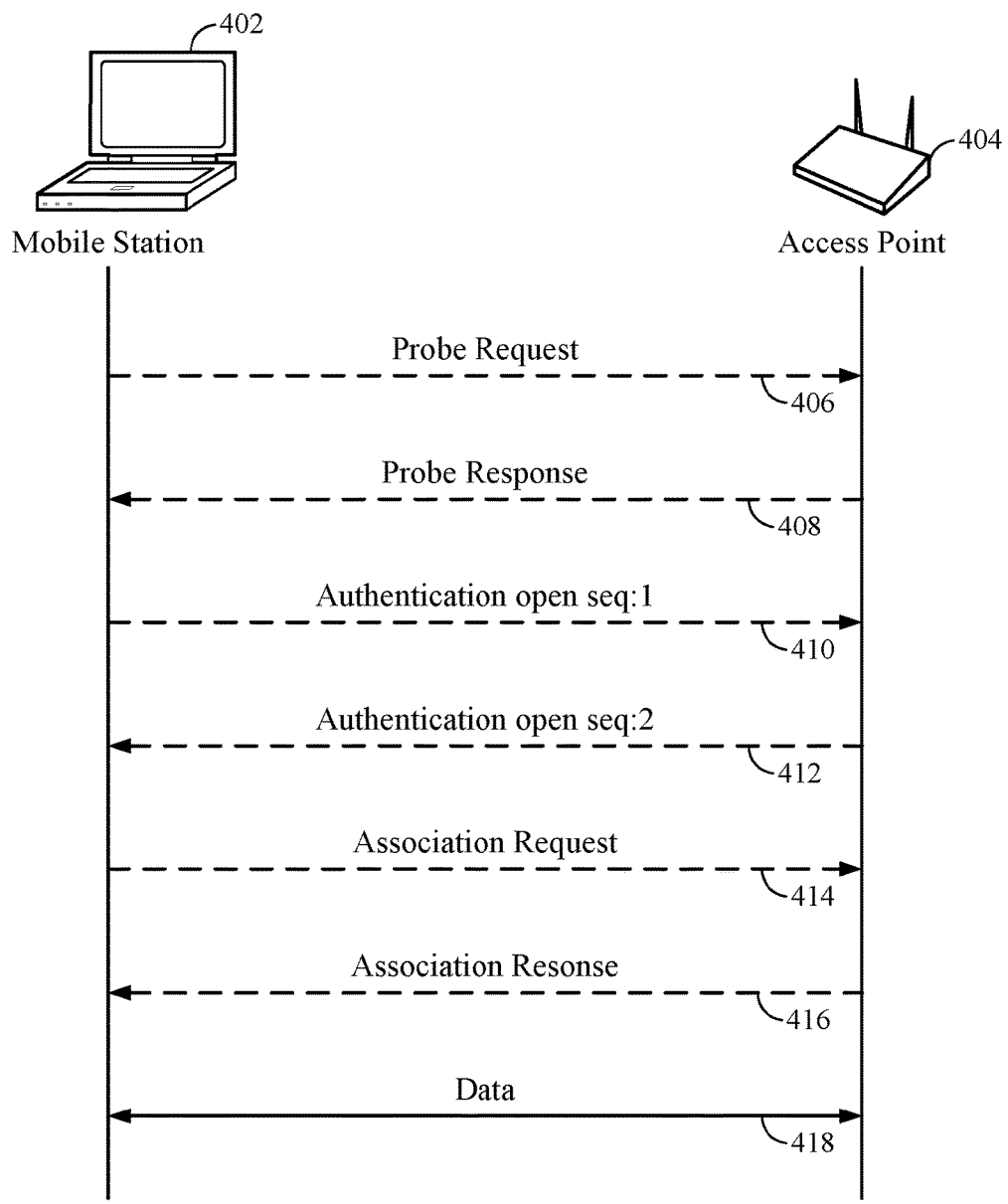
FIG. 4 is a message flow diagram illustrating a process to associate wireless transceiver devices in an association process according to an embodiment.

At block 504, the first wireless transceiver device may transmit a messages to the second wireless transceiver device comprising parameters indicative of range determined at block 502. The message transmitted at block 504 may be received by a wireless transceiver device. Parameters indicative of range in the message transmitted at block 504 may be processed to support one or more applications by a processor at the wireless transceiver device. Here, in the particular illustrated example, block 504 may transmit the message while the first and second wireless transceiver devices are not in an associated state as discussed above. Here, the first and second wireless transceiver devices may be capable of communicating in a physical wireless link (e.g., a wireless link according to IEEE std. 802.11) using data link messaging. While in the unassociated state, however, there may be no established channel to transmit messages through the physical wireless link at a layer higher than the data link messaging. For example, while in the unassociated state, the first and second wireless transceiver devices may have no established channel to exchange an FTM Range Report message. In this context, as illustrated in FIG. 4 and discussed above, a client device (e.g., a client mobile device) and an access device (e.g., an access point configured to communicate with the client device according to IEEE std. 802.11) are in an "associated" state following transmission of an association response message (e.g., by the access device) in response an association request message (e.g., by the client device), and receipt of the association response message (e.g., at the client device). As also illustrated in FIG. 4, such an exchange of an association request message and an association response message may occur following an exchange of probe request and probe response messages, and an exchange of authentication messages. Further in this context, devices that are "not associated" means devices that have never exchanged an association request message followed by an association response message as discussed above, or have not exchanged an association request message (or reassociation request message) followed by an association response message (or reassociation response message) following an event that disassociates the devices (e.g., an event that disassociates the devices from a prior association state).

According to an embodiment, parameters indicative of a range between devices may be made available via a stand-alone and independent Information Element in any one of several different types of messages or frames that may be transmitted between wireless transceiver devices (e.g., at block 504), regardless of whether the wireless transceiver devices are associated beforehand (e.g., even between devices that are not associated beforehand such as the first and second wireless transceiver devices referred to in FIG.

4). For example, in addition to FTM or FTM request messages, any one of several existing IEEE std. 802.11 frames that support Information Elements (e.g. beacons, probe requests, probe responses, association requests/responses, ANQP query request, ANQP query response, and so on) may be used to transmit parameters indicative of a range between the device that is transmitting the frame to another device. In this context, such Information Elements may comprise a collection of related fields of a message specifically formatted to include an Element ID field, Length field, Element ID Extension field or an Information field in a particular format as set forth in IEEE std. 802.11 for inclusion in a message or frame. Using messages or frames supporting use of Information elements may enable devices to obtain range parameters using the process shown in FIG. 2, but then to transmit the obtained range parameters in information elements in subsequent messages to target devices (without first associating with the target devices). This may enable a plethora of applications without overhead of having to perform an FTM procedure just-in-time to obtain range values.

FIGS. 6 and 7 are diagrams showing fields of a message transmitted between wireless transceiver devices (e.g., between an initiating STA and a responding STA) according to an embodiment. FIG. 6 shows fields of an information element in a message transmitted between devices (e.g., beacons, probe requests, probe responses, association requests/responses, Access Network Query Protocol (ANQP) query request message, ANQP query response message, and so on). As such, the message including an information element according to FIG. 6 may be transmitted between devices that are not associated beforehand (e.g., in a process described above in FIG. 4). In a particular implementation, the fields of the information element of FIG. 5 may be selected from a reserved element identifier defined in IEEE std. 802.11 specification as a ranging information element. According to an embodiment, a variable length field "Information" shown in FIG. 6 may comprise one or more parameters indicative of a range (e.g., a range between the transmitting device and another device). As pointed out above, these one or more parameters indicative of a range may be determined based on an exchange of messages as described above with reference to FIG. 2 (e.g., based on RTT or TOF measurements), for example.

According to an embodiment, range parameters expressed in the variable length "Information" field of FIG. 6 may be provided in fields shown in FIG. 7. In a particular implementation, field "Measurement Start Time" in a message to a recipient device may contain the least significant four octets of a Timing Synchronization Function (TSF) of the recipient device. In one embodiment, a device transmitting a message containing range parameters may determine a TSF of a recipient device from a previously received beacon or probe response if the recipient device comprises an access point, for example. For other types of recipient devices, such as NAN/P2P devices, etc., TSFs of transmitting and recipient devices may already be synchronized. A "Range" field may specify a measured range between the recipient device and a transmitting device. For example, if the measured range is determined using a message exchange as shown in FIG. 2, the "Range" field may express a range in units of 1/4096 m, for example. Alternatively, the "Range" field may express a round-trip time or time of flight. The least four significant octets of the TSF of the recipient device in the "Measurement Start Time" field may enable the recipient device to determine how stale or relevant measurements or parameters in the "Range" field may be. Alternatively, for example if the TSF function is not available to the transmitting device, a value expressing an age of range parameters in field "Range" may be provided (e.g., duration of time since parameters in field "Range" were determined in units of microseconds).

A field "Max Range Error Exponent" in FIG. 7 may comprise one byte to express an exponent of an upper bound for an error in the value specified in the "Range" field. A value of zero in field "Max Range Error Exponent" may indicate an unknown error. A nonzero value in field "Max Range Error Exponent" may indicate a maximum range error of $2^{Max\ Range\ Error\ Exponent-13}$ m, for example. A value for field "Max Range Error Exponent" may have a maximum value of 25, for example. Values in the range 26-255 for field "Max Range Error Exponent" may be reserved. A value of 25 may indicate a maximum range error of 4096 m or higher. For instance, a value of 14 in field "Max Range Error Exponent" may indicate that the value in field "Range" has a maximum error of ±2 m.

As pointed out above, the specific example of a message containing fields shown in FIG. 7 may be applicable to providing parameters indicative of a range between a first wireless transceiver device transmitting the message and a second wireless transceiver device receiving the message. In other embodiments, fields of FIG. 7 may be extended to provide parameters in a message transmitted from a first wireless transceiver device to a second wireless transceiver device indicative of a range between the first transmitting and a third wireless transceiver device that is not the second wireless transceiver device. For example, a field providing an identifier of the third wireless transceiver device (e.g., a BSSID or other identifier) may be included in addition to fields shown in FIG. 7.

According to particular implementations, a first wireless transceiver device may transmit to a second wireless transceiver device a message comprising fields indicative of a range shown in FIGS. 6 and 7 (without association of the first and second wireless transceiver devices beforehand) for any one of several applications. For example, the first and second wireless transceiver devices may comprise mobile game consoles where a change in range between the first and second wireless transceiver devices affects a game state. In another implementation, where the first wireless transceiver device is attached to a child, such a message may be transmitted to the second wireless transceiver device in a babysitter application. In another implementation, where the first wireless transceiver device is attached to an employee at a place of business, such a message may be transmitted to the second wireless transceiver device in an application to monitor whether the employee is doing an assigned task (e.g., by determining whether a range between the first and second device is greater to or less than a particular threshold range value). In another particular implementation, such a message may be transmitted between first and second wireless transceiver devices in an emergency response application (e.g., E911) where a measured range in the message is indicative of a location of the second wireless transceiver device.

In another particular implementation, a first wireless transceiver device may be implemented in a first automobile and a second wireless transceiver device may be implemented in a second wireless transceiver device. Without a process to associate the first wireless transceiver device with the second wireless transceiver device beforehand, the first wireless transceiver device may transmit a message the second wireless transceiver device comprising one or more parameters indicative of a range between the first and second wireless transceiver devices as shown in FIGS. 6 and 7. The second wireless transceiver device may use the one or more parameters indicative of the range for any one of several applications such as collision avoidance. In another implementation, the message may comprise a range rate (e.g., indicating a rate at which a range between the first and second wireless transceiver devices is increasing or decreasing).

Figure 8:
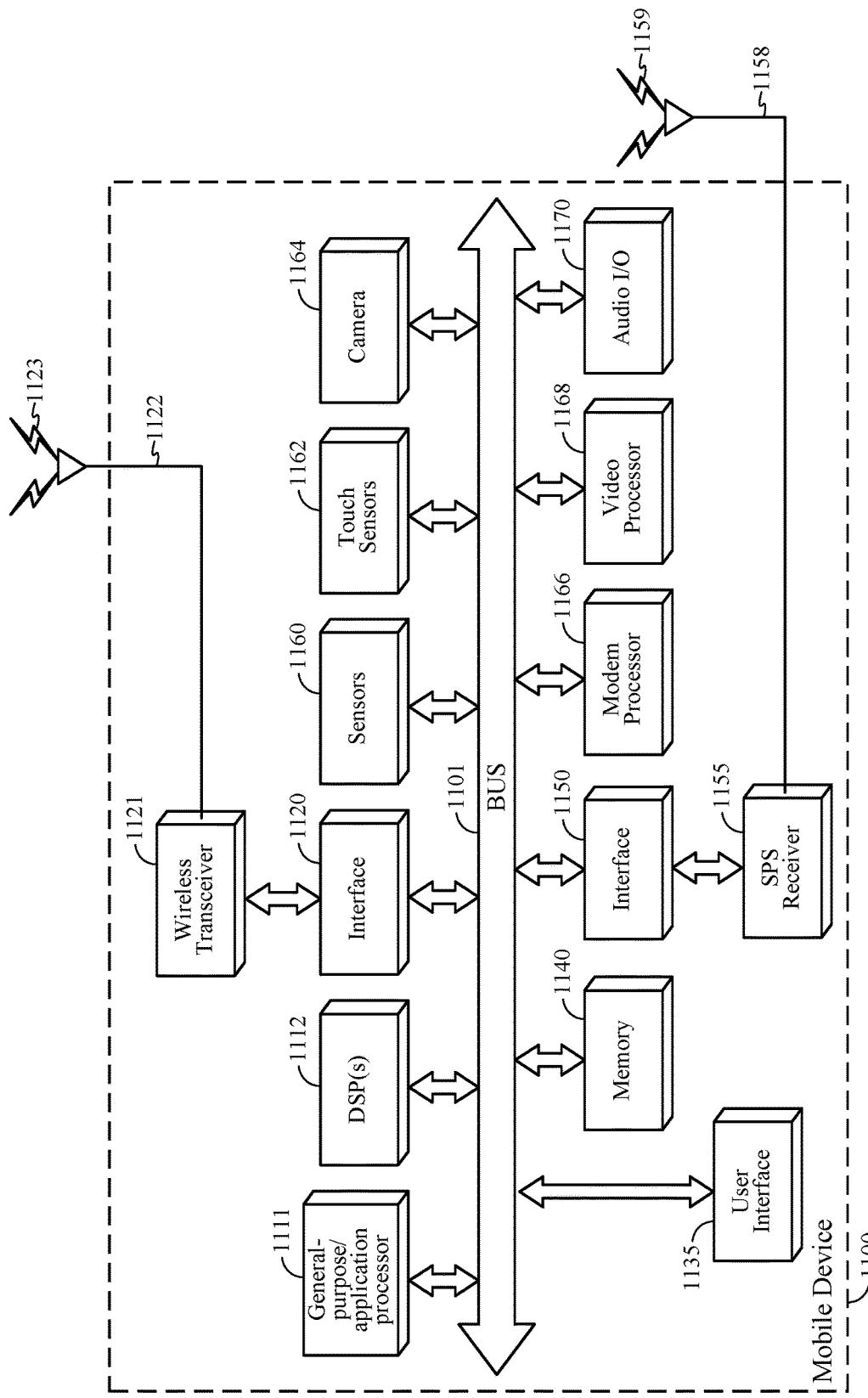
FIG. 8 is a schematic block diagram illustrating an exemplary device, in accordance with an implementation.
Figure 9:
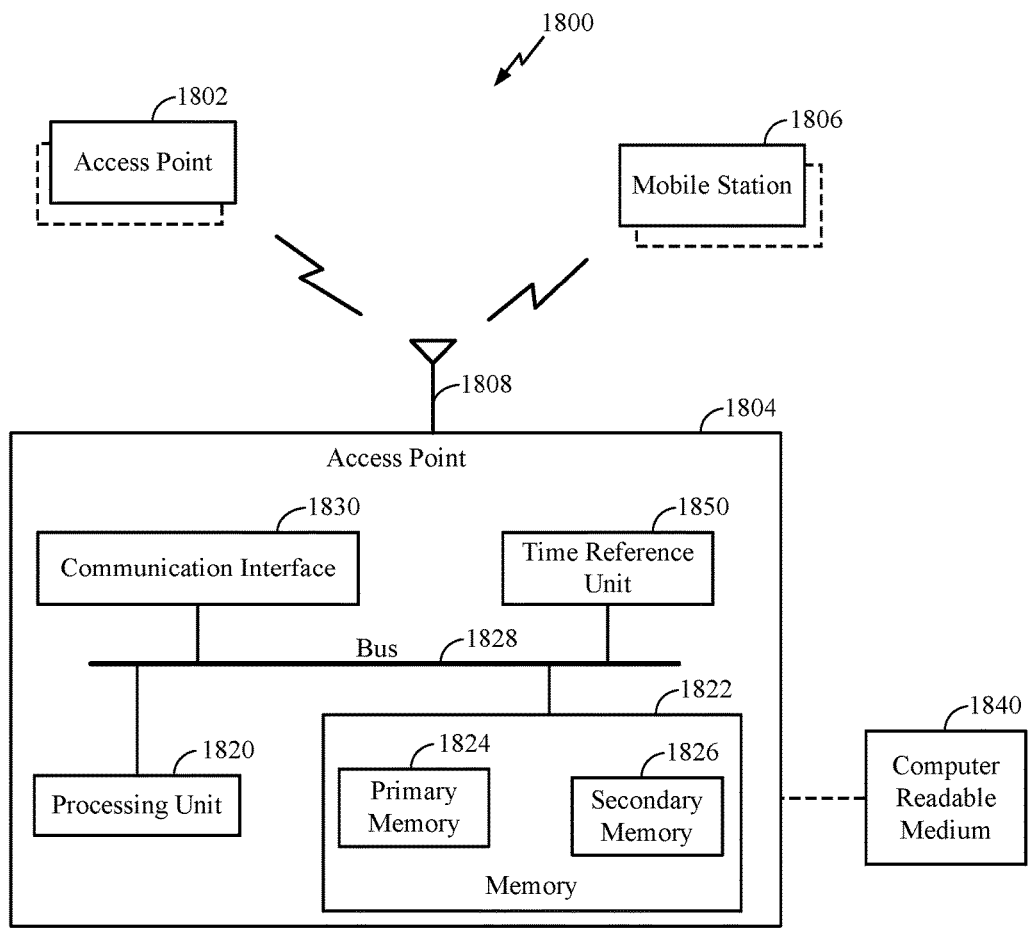
FIG. 9 is a schematic block diagram of an example computing system in accordance with an implementation.

Subject matter shown in FIGS. 8 and 9 may comprise features, for example, of a computing device, in an embodiment. It is further noted that the term computing device, in general, refers at least to one or more processors and a memory connected by a communication bus. Likewise, in the context of the present disclosure at least, this is understood to refer to sufficient structure within the meaning of 35 USC § 112(f) so that it is specifically intended that 35 USC § 112(f) not be implicated by use of the term "computing device," "wireless station," "wireless transceiver device" and/or similar terms; however, if it is determined, for some reason not immediately apparent, that the foregoing understanding cannot stand and that 35 USC § 112(f) therefore, necessarily is implicated by the use of the term "computing device," "wireless station," "wireless transceiver device" and/or similar terms, then, it is intended, pursuant to that statutory section, that corresponding structure, material and/or acts for performing one or more functions be understood and be interpreted to be described at least in FIGS. 5A and 5B, and corresponding text of the present disclosure.

FIG. 8 is a schematic diagram of a mobile device according to an embodiment. Mobile device 100 (FIG. 1) may comprise one or more features of mobile device 1100 shown in FIG. 8. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 8, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein. In a particular implementation, wireless transceiver 1121 may communicate with general-purpose processor(s) 1111 and/or DSP(s) 1112 through bus 1101 to enable mobile device 1100 to be configured as a wireless STA as discussed above. General-purpose processor(s) 1111 and/or DSP(s) 1112 may execute instructions to execute one or more aspects of processes discussed above in connection with FIGS. 2 through 7.

In one particular implementation, transmission of an ACK message in response to a FTM measurement request message may be performed by wireless transceiver device 1121 without instruction or initiation from general-purpose processor(s) 1111or DSP(s) 1112. On the other hand, an FTM range report message may be formed at a programmable device such as general-purpose processor(s) 1111 and/or DSP(s) 1112 (e.g., from execution of one or more machine-readable instructions stored in memory 1140).

Also shown in FIG. 8, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose/application processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Dedicated camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, dedicated video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose/application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, dedicated modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

FIG. 9 is a schematic diagram illustrating an example system 1800 that may include one or more devices configurable to implement techniques or processes described above, for example, in connection with FIG. 1. System 1800 may include, for example, a first device 1802, a second device 1804, and a third device 1806, which may be operatively coupled together through a wireless communications network. In an aspect, first device 1802 may comprise an access point as shown, for example. Second device 1804 may comprise an access point (e.g., local transceiver 115 or base station transceiver 110) and third device 1806 may comprise a mobile station or mobile device, in an aspect. Also, in an aspect, devices 1802, 1804 and 1802 may be included in a wireless communications network may comprise one or more wireless access points, for example. However, claimed subject matter is not limited in scope in these respects.

First device 1802, second device 1804 and third device 1806, as shown in FIG. 9, may be representative of any device, appliance or machine that may be configurable to exchange data over a wireless communications network. By way of example but not limitation, any of first device 1802, second device 1804, or third device 1806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1802, 1804, and 1806, respectively, may comprise one or more of an access point or a mobile device in accordance with the examples described herein.

Similarly, a wireless communications network, as shown in FIG. 9, is representative of one or more communication links, processes, or resources configurable to support the exchange of data between at least two of first device 1802, second device 1804, and third device 1806. By way of example but not limitation, a wireless communications network may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1806, there may be additional like devices operatively coupled to wireless communications network 1808.

It is recognized that all or part of the various devices and networks shown in FIG. 9, and the processes and methods as further described herein, may be implemented using or otherwise including hardware, firmware, software, or any combination thereof.

Thus, by way of example but not limitation, second device 1804 may include at least one processing unit 1820 that is operatively coupled to a memory 1822 through a bus 1828.

Processing unit 1820 is representative of one or more circuits configurable to perform at least a portion of a data computing procedure or process. By way of example but not limitation, processing unit 1820 may include one or more processors, controllers, microprocessors, microcontrollers, application specific integrated circuits, digital signal processors, programmable logic devices, field programmable gate arrays, and the like, or any combination thereof.

Memory 1822 is representative of any data storage mechanism. Memory 1822 may include, for example, a primary memory 1824 or a secondary memory 1826. Primary memory 1824 may include, for example, a random access memory, read only memory, etc. While illustrated in this example as being separate from processing unit 1820, it should be understood that all or part of primary memory 1824 may be provided within or otherwise co-located/coupled with processing unit 1820. In a particular implementation, memory 1822 and processing unit 1820 may be configured to execute one or more aspects of process discussed above in connection with FIGS. 2 through 7.

Secondary memory 1826 may include, for example, the same or similar type of memory as primary memory or one or more data storage devices or systems, such as, for example, a disk drive, an optical disc drive, a tape drive, a solid state memory drive, etc. In certain implementations, secondary memory 1826 may be operatively receptive of, or otherwise configurable to couple to, a computer-readable medium 1840. Computer-readable medium 1840 may include, for example, any non-transitory medium that can carry or make accessible data, code or instructions for one or more of the devices in system 1800. Computer-readable medium 1840 may also be referred to as a storage medium.

Second device 1804 may include, for example, a communication interface 1830 that provides for or otherwise supports the operative coupling of second device 1804 to a wireless communications network at least through an antenna 1808. By way of example but not limitation, communication interface 1830 may include a network interface device or card, a modem, a router, a switch, a transceiver, and the like. In other alternative implementations, communication interface 1830 may comprise a wired/LAN interface, wireless LAN interface (e.g., IEEE std. 802.11 wireless interface) and/or a wide area network (WAN) air interface. In a particular implementation, antenna 1808 in combination with communication interface 1830 may be used to implement transmission and reception of signals as illustrated in FIGS. 2 through 7.

In one particular implementation, transmission of an ACK message in response to a FTM measurement request message may be performed at communication interface 1830 without instruction or initiation from processing unit 1830. On the other hand, an FTM range report message may be formed at a programmable device such as processing unit 1820 (e.g., from execution of one or more machine-readable instructions stored in memory 1820).

Second device 1804 may include, for example, an input/output device 1832. Input/output device 1832 is representative of one or more devices or features that may be configurable to accept or otherwise introduce human or machine inputs, or one or more devices or features that may be configurable to deliver or otherwise provide for human or machine outputs. By way of example but not limitation, input/output device 1832 may include an operatively configured display, speaker, keyboard, mouse, trackball, touch screen, data port, etc.

One embodiment, as described above, is directed to a method at a first wireless transceiver device comprising: transmitting one or more messages from the first wireless transceiver device to a second wireless transceiver device comprising one or more parameters indicative of a range between the first wireless transceiver device and a third wireless transceiver device other than the second wireless transceiver device, wherein the one or more parameters are determined based, at least in part, on receipt of one or more fine timing measurement (FTM) messages received at the first wireless transceiver device, and wherein the first and second wireless transceiver devices are not associated. In one particular implementation, at least one of the one or more messages is transmitted in a format that supports transmission of Information Elements. In another particular implementation, the one or more messages comprise a beacon message, probe request message, probe response message, association request message or an association response message. In another particular implementation, the one or more messages comprise a wireless local area network (WLAN) management frame. In another particular implementation, the one or more messages further comprise an indication of a time that a range measurement was obtained relative to a TSF of the second wireless transceiver device. In another particular implementation, the one or more messages further comprises an indication of an age of a range measurement that was obtained.

Another embodiment, as described above, is directed to a first wireless station (STA), comprising: a wireless transceiver; and a processor coupled to the wireless transceiver to: initiate transmission of a message from the first STA to a second STA comprising one or more parameters indicative of a range between the first STA and a third STA other than the second STA, wherein the one or more parameters are determined based, at least in part, on receipt of one or more fine timing measurement (FTM) messages received at the first wireless transceiver device, and wherein the first and second wireless transceiver devices are not associated. In one particular implementation, at least one of the one or more messages is transmitted in a format that supports transmission of Information Elements. In another particular implementation, the one or more messages comprise a beacon message, probe request message, probe response message, association request message or an association response message. In another particular implementation, the one or more messages comprise a wireless local area network (WLAN) management frame. In another particular implementation, the one or more messages further comprise an indication of a time that a range measurement was obtained relative to a TSF of the second wireless transceiver device. In another particular implementation, the one or more messages further comprises an indication of an age of a range measurement that was obtained.

Another embodiment, as described above, is directed to a first wireless transceiver device, comprising: means for determining one or more parameters indicative of a range between the first wireless transceiver device and a second wireless transceiver device based, at least in part, on receipt of one or more fine timing measurement (FTM) messages received at the first wireless transceiver device; and means for transmitting one or more messages from the first wireless transceiver device to a third wireless transceiver device other than the second wireless transceiver device comprising the one or more parameters, wherein the first and third wireless transceiver devices are not associated. In one particular implementation, at least one of the one or more messages is transmitted in a format that supports transmission of Information Elements. In another particular implementation, the one or more messages comprise a beacon message, probe request message, probe response message, association request message or an association response message. In another particular implementation, the one or more messages comprise a wireless local area network (WLAN) management frame. In another particular implementation, the one or more messages further comprise an indication of a time that a range measurement was obtained relative to a TSF of the second wireless transceiver device. In another particular implementation, the one or more messages further comprises an indication of an age of a range measurement that was obtained.

Another embodiment, as described above, is directed to a non-transitory storage medium comprising computer readable instructions stored thereon which are executable by a processor of a first wireless transceiver device to: initiate transmission of one or more messages from the first wireless transceiver device comprising one or more parameters indicative of a range between the first wireless transceiver device and a third wireless transceiver device other than the second wireless transceiver device, wherein the one or more parameters are determined based, at least in part, on receipt of one or more fine timing measurement (FTM) messages received at the first wireless transceiver device, and wherein the first and second wireless transceiver devices are not associated. In one particular implementation, at least one of the one or more messages is transmitted in a format that supports transmission of Information Elements. In another particular implementation, the one or more messages comprise a beacon message, probe request message, probe response message, association request message or an association response message. In another particular implementation, the one or more messages comprise a wireless local area network (WLAN) management frame. In another particular implementation, the one or more messages further comprise an indication of a time that a range measurement was obtained relative to a TSF of the second wireless transceiver device. In another particular implementation, the one or more messages further comprises an indication of an age of a range measurement that was obtained.

Another embodiment, as described above, is directed to a method at first wireless transceiver device, comprising: receiving one or more messages from a second wireless transceiver device comprising one or more parameters indicative of a range between the second wireless transceiver device and a third wireless transceiver device other than the first wireless transceiver device, wherein the one or more parameters are determined based, at least in part, on receipt of one or more fine timing measurement (FTM) messages at the second wireless transceiver device, and wherein the first and second wireless transceiver devices are not associated. In one particular implementation, at least one of the one or more messages is transmitted in a format that supports transmission of Information Elements. In another particular implementation, the one or more messages comprise a beacon message, probe request message, probe response message, association request message or an association response message. In another particular implementation, the one or more messages comprise a wireless local area network (WLAN) management frame. In another particular implementation, the one or more messages further comprise an indication of a time that a range measurement was obtained relative to a TSF of the second wireless transceiver device. In another particular implementation, the one or more messages further comprises an indication of an age of a range measurement that was obtained. In another particular implementation, the method further comprises processing the one or more parameters in the received one or more messages for use in at least one application, wherein the first and second wireless transceiver devices are not associated Another embodiment, as described above, is directed to a first wireless station (STA), comprising: a wireless transceiver; and a processor coupled to the wireless transceiver and configured to: obtain one or more messages received at the wireless transceiver from a second STA comprising one or more parameters indicative of a range between the second STA and a third STA other than the first STA, wherein the one or more parameters are determined based, at least in part, on receipt of one or more fine timing measurement (FTM) messages at the second wireless transceiver device, and wherein the first and second wireless transceiver devices are not associated. In one particular implementation, at least one of the one or more messages is transmitted in a format that supports transmission of Information Elements. In another particular implementation, the one or more messages comprise a beacon message, probe request message, probe response message, association request message or an association response message. In another particular implementation, the one or more messages comprise a wireless local area network (WLAN) management frame. In another particular implementation, the one or more messages further comprise an indication of a time that a range measurement was obtained relative to a TSF of the second wireless transceiver device. In another particular implementation, the one or more messages further comprises an indication of an age of a range measurement that was obtained. In another particular implementation, the processor may be further configured to process the one or more parameters in the received one or more messages for use in at least one application.

Another embodiment, as described above, is directed to a non-transitory storage medium comprising computer readable instructions stored thereon which are executable by a processor of a first wireless transceiver device to: obtain one or more messages received at the first wireless transceiver device from a second wireless transceiver device comprising one or more parameters indicative of a range between the second wireless transceiver device and a third wireless transceiver device other than the first wireless transceiver device, wherein the one or more parameters are determined based, at least in part, on receipt of one or more fine timing measurement (FTM) messages at the second wireless transceiver device, and wherein the first and second wireless transceiver devices are not associated. In one particular implementation, at least one of the one or more messages is transmitted in a format that supports transmission of Information Elements. In another particular implementation, the one or more messages comprise a beacon message, probe request message, probe response message, association request message or an association response message. In another particular implementation, the one or more messages comprise a wireless local area network (WLAN) management frame. In another particular implementation, the one or more messages further comprise an indication of a time that a range measurement was obtained relative to a TSF of the second wireless transceiver device. In another particular implementation, the one or more messages further comprises an indication of an age of a range measurement that was obtained. In another particular implementation, the computer readable instructions may be further executable to processing the one or more parameters in the received one or more messages for use in at least one application, wherein the first and second wireless transceiver devices are not associated Another embodiment, as described above, is directed to a method at a first wireless transceiver device comprising: receiving one or more messages from a second wireless transceiver device comprising one or more parameters indicative of a range between the first wireless transceiver device and a the second wireless transceiver device, wherein the one or more parameters are determined based, at least in part, on receipt of one or more fine timing measurement (FTM) messages at the second wireless transceiver device, and wherein the first and second wireless transceiver devices are not associated. In one particular implementation, at least one of the one or more messages is transmitted in a format that supports transmission of Information Elements. In another particular implementation, the one or more messages comprise a beacon message, probe request message, probe response message, association request message or an association response message. In another particular implementation, the one or more messages comprise a wireless local area network (WLAN) management frame. In another particular implementation, the one or more messages further comprise an indication of a time that a range measurement was obtained relative to a TSF of the second wireless transceiver device. In another particular implementation, the one or more messages further comprises an indication of an age of a range measurement that was obtained. In another particular implementation, the method further comprises processing the one or more parameters in the one or more received messages for use in at least one application.

Another embodiment, as described above, is directed to a first wireless station (STA), comprising: a wireless transceiver; and a processor coupled to the wireless transceiver configured to: obtain one or more messages received at the wireless transceiver from a second STA comprising one or more parameters indicative of a range between the first STA and the second STA, wherein the one or more parameters are determined based, at least in part, on receipt of one or more fine timing measurement (FTM) messages at the second wireless transceiver device, and wherein the first and second wireless transceiver devices are not associated. In one particular implementation, at least one of the one or more messages is transmitted in a format that supports transmission of Information Elements. In another particular implementation, the one or more messages comprise a beacon message, probe request message, probe response message, association request message or an association response message. In another particular implementation, the one or more messages comprise a wireless local area network (WLAN) management frame. In another particular implementation, the one or more messages further comprise an indication of a time that a range measurement was obtained relative to a TSF of the second wireless transceiver device. In another particular implementation, the one or more messages further comprises an indication of an age of a range measurement that was obtained. In another particular implementation, the processor may be further configured to process the one or more parameters in the one or more messages received from the second wireless transceiver devices for use in at least one application.

Another embodiment, as described above, is directed to non-transitory storage medium comprising computer readable instructions stored thereon which are executable by a processor of a first wireless transceiver device to: obtain one or more messages received at the first wireless transceiver device from a second wireless transceiver device comprising one or more parameters indicative of a range between the first wireless transceiver device and the second wireless transceiver device, wherein the one or more parameters are determined based, at least in part, on receipt of one or more fine timing measurement (FTM) messages at the second wireless transceiver device, and wherein the first and second wireless transceiver devices are not associated. In one particular implementation, at least one of the one or more messages is transmitted in a format that supports transmission of Information Elements. In another particular implementation, the one or more messages comprise a beacon message, probe request message, probe response message, association request message or an association response message. In another particular implementation, the one or more messages comprise a wireless local area network (WLAN) management frame. In another particular implementation, the one or more messages further comprise an indication of a time that a range measurement was obtained relative to a TSF of the second wireless transceiver device. In another particular implementation, the one or more messages further comprises an indication of an age of a range measurement that was obtained. In another particular implementation, the computer readable instructions are further executable to processing the one or more parameters in the one or more received messages for use in at least one application.

As used herein, the term "access point" is meant to include any wireless communication station and/or device used to facilitate communication in a wireless communications system, such as, for example, a wireless local area network, although the scope of claimed subject matter is not limited in this respect. In another aspect, an access point may comprise a wireless local area network (WLAN) access point, for example. Such a WLAN may comprise a network compatible and/or compliant with one or more versions of IEEE standard 802.11 in an aspect, although the scope of claimed subject matter is not limited in this respect. A WLAN access point may provide communication between one or more mobile devices and a network such as the Internet, for example.

As used herein, the term "mobile device" refers to a device that may from time to time have a position location that changes. The changes in position location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, bytes, values, elements, symbols, characters, terms, numbers, numerals, expressions, messages, fields, identifiers frames, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. In this context, a "wireless communication network" comprises multiple devices or nodes capable of communicating with one another through one or more wireless communication links. As shown in FIG. 1, for example, a wireless communication network may comprise two or more devices from mobile devices 100a, 100b, 115a and 115b. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples. References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn. While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. At a first wireless transceiver device, a method comprising:
    determining one or more parameters indicative of a range between the first wireless transceiver device and a second wireless transceiver device based, at least in part, on receipt of one or more fine timing measurement (FTM) messages received at the first wireless transceiver device; and
    transmitting one or more messages from the first wireless transceiver device to the second wireless transceiver device comprising the one or more parameters indicative of the range between the first wireless transceiver device and the second wireless transceiver device, wherein the first and second wireless transceiver devices are not associated.

2. The method of claim 1, wherein at least one of the one or more messages is transmitted in a format that supports transmission of Information Elements.

3. The method of claim 1, wherein the one or more messages comprise a beacon message, probe request message, probe response message, association request message or an association response message.

4. The method of claim 1, wherein the one or more messages comprise a wireless local area network (WLAN) management frame.

5. The method of claim 1, and wherein the one or more messages further comprise an indication of a time that a range measurement was obtained relative to a Timing Synchronization Function (TSF) of the second wireless transceiver device.

6. The method of claim 1, and wherein the one or more messages further comprises an indication of an age of a range measurement that was obtained.

7. A first wireless station (STA), comprising:
    a wireless transceiver; and
    a processor coupled to the wireless transceiver to:
    determine one or more parameters indicative of a range between the first STA and a second STA based, at least in part, on receipt of one or more fine timing measurement (FTM) messages received at the first STA; and
    initiate transmission of one or more messages through the wireless transceiver to the second STA comprising the one or more parameters indicative of the range between the first STA and the second STA, and wherein the first and second STAs are not associated.

8. The first STA of claim 7, wherein the one or more messages comprise a beacon message, probe request message, probe response message, association request message or an association response message.

9. The first STA of claim 7, wherein the one or more messages comprise a wireless local area network (WLAN) management frame.

10. The first STA of claim 7, and wherein the one or more messages further comprise an indication of a time that a range measurement was obtained relative to a Timing Synchronization Function (TSF) of the second STA.

11. The STA of claim 7, and wherein the one or more messages further comprise an indication of an age of a range measurement that was obtained.

12. A first wireless transceiver device, comprising:
    means for determining one or more parameters indicative of a range between the first wireless transceiver device and a second wireless transceiver device based, at least in part, on receipt of one or more fine timing measurement (FTM) messages received at the first wireless transceiver device; and means for transmitting one or more messages from the first wireless transceiver device to the second wireless transceiver device comprising the one or more parameters indicative of the range between the first wireless transceiver device and the second wireless transceiver device, wherein the first and second wireless transceiver devices are not associated.

13. The first wireless transceiver device of claim 12, wherein the one or more messages comprise a beacon message, probe request message, probe response message, association request message or an association response message.

14. The first wireless transceiver device of claim 12, wherein the one or more messages comprise a wireless local area network (WLAN) management frame.

15. The first wireless transceiver device of claim 12, wherein the one or more messages further comprise an indication of a time that a range measurement was obtained relative to a Timing Synchronization Function (TSF) of the second wireless transceiver device.

16. The first wireless transceiver device of claim 12, wherein the one or more messages further comprise an indication of an age of a range measurement that was obtained.

17. A non-transitory storage medium comprising computer readable instructions stored thereon which are executable by a processor of a first wireless transceiver device to:

determine one or more parameters indicative of a range between the first wireless transceiver device and a second wireless transceiver device based, at least in part, on receipt of one or more fine timing measurement (FTM) messages received at the first wireless transceiver device; and initiate transmission of one or more messages through the first wireless transceiver device comprising the one or more parameters indicative of the range between the first wireless transceiver device and the second wireless transceiver device, and wherein the first and second wireless transceiver devices are not associated.

18. The storage medium of claim 17, wherein the one or more messages comprise a beacon message, probe request message, probe response message, association request message or an association response message.

19. The storage medium of claim 17, wherein the one or more messages comprise a wireless local area network (WLAN) management frame.

20. The storage medium of claim 17, and wherein the one or more messages further comprise an indication of a time that a range measurement was obtained relative to a Timing Synchronization Function (TSF) of the second wireless transceiver device.

21. The storage medium of claim 17, and wherein the one or more messages further comprise an indication of an age of a range measurement that was obtained.

* * * * *